United States Patent [19]

Hunter et al.

[11] 3,946,064

[45] Mar. 23, 1976

[54] HYDRAZODICARBOXYLATES AND USE THEREOF AS BLOWING AGENTS

[75] Inventors: Byron A. Hunter, Woodbridge; Gerald J. Hollmann, Naugatuck, both of Conn.

[73] Assignee: Uniroyal, Inc., New York, N.Y.

[22] Filed: Apr. 9, 1975

[21] Appl. No.: 566,478

Related U.S. Application Data

[60] Division of Ser. No. 456,994, April 1, 1974, Pat. No. 3,894,974, which is a continuation-in-part of Ser. No. 354,818, April 26, 1973, abandoned.

[52] U.S. Cl. ............................................ 260/463
[51] Int. Cl.$^2$ ...................................... C07C 69/96
[58] Field of Search ................................. 260/463

[56] References Cited
UNITED STATES PATENTS 3,663,603  5/1972  Muller et al. ............... 260/463 X
3,819,545  6/1974  Hunter ......................... 260/463 X
3,873,592  3/1975  Hunter ......................... 260/463

OTHER PUBLICATIONS

RabJohn, J.A.C.S., 70, (1948), pp. 1181–1183.

Primary Examiner—Joseph P. Brust
Attorney, Agent, or Firm—Robert J. Patterson

[57] ABSTRACT

Certain hydrazodicarboxylates, namely polymers or oligomers made by reacting hydrazine with polyfunctional haloformates, especially difunctional haloformates, cyclized forms of said oligomers and condensation products of hydrocarbyl carbazates with polyfunctional, especially difunctional, haloformates are useful as chemical blowing agents for expanding gas-expandable polymeric materials. These compounds are novel.

3 Claims, No Drawings

HYDRAZODICARBOXYLATES AND USE THEREOF AS BLOWING AGENTS

CROSS-REFERENCE TO RELATED APPLICATIONS

This application is a divisional application of copending application Ser. No. 456,994 filed Apr. 1, 1974, now U.S. Pat. No. 3,894,974, issued July 15, 1975, which is a continuation-in-part of application Ser. No. 354,818 filed Apr. 26, 1973, now abandoned.

BACKGROUND OF THE INVENTION

1. Field of the Invention

This invention relates to the production of gasexpanded polymeric materials with a new class of chemical blowing agents, namely certain hydrazodicarboxylates. These compounds are novel.

2. Description of the Prior Art

Blowing agents which decompose at relatively high temperatures are not new. U.S. Pat. No. 3,235,519 discloses using sulfonyl semicarbazides as blowing agents for polymeric materials which soften above 170°C. These blowing agents are particularly suitable for expanding high density polyethylenes, and many other rubbery and plastic polymers.

U.S. Pat. No. 3,554,397 discloses the use of certain dihydrocarbyl, especially dimethyl and diethyl, hdyrazodicarboxylates, as blowing agents in polyamide type polymers. However, this patent does not suggest the particular hydrazodicarboxylates of the present invention or the unexpected advantages thereof which are discussed below.

SUMMARY OF THE INVENTION

This invention provides a new class of blowing agents which begin to decompose non-explosively, and controllably, at temperatures not lower than 200°C, and preferably not lower than 225°C, but have high heat stability at temperatures below 200°C. Thus, they are useful for expanding polymeric materials that soften at, or below, these high temperatures. These new compounds are particularly suitable as high temperature blowing agents because of their especially low rate of sublimation even at elevated temperatures.

Broadly, the new class of blowing agents of the present invention includes certain hydrazodicarboxylates namely polymers or oligomers made by reacting hydrazine which polyfunctional haloformates, cyclized forms of such oligomers, and certain condensation products of hydrocarbylcarbazates with polyfunctional haloformates. Upon decomposition, these blowing agents produce olefins, carbon dioxide, carbon monoxide, and alcohols, and smaller amounts of nitrogen.

The method of the present invention comprises incorporating in a gas-expandable polymeric material at least one blowing agent which is an oligomer, cyclized form thereof, or a condensation product of the types fully disclosed below, and then heating the resultant composition to a temperature above the decomposition temperature of the blowing agent to cause it to liberate gas and thereby expand the polymeric material. The techniques employed to effect the expansion and formation of the final expanded product will be obvious to workers of ordinary skill in the art from the following disclosure.

The term "polymeric material" as used herein means homopolymers, interpolymers, graft polymers, and mixtures and blends of two or more of these, and includes thermoplastic, thermosetting and rubbery polymers. In particular, the new blowing agents of the invention are useful for expanding polymers that have high processing temperatures such as the polycarbonates, phenylene oxidebased resins, poly(arylsulfones), the various nylons, polyesters, certain polystyrenes, polypropylene, poly (styrene-acrylonitrile), polyacetals, urethane elastomers, polyvinyl polymers, poly(phenylene sulfide), poly(methylpentene), certain polyethylenes, polyimides, poly(aryl ethers), ABS polymers, polyacrylics, cellulosic polymers, halogenated polymers, especially the fluoroplastics, poly(ethylenevinyl acetate), and polymer alloys.

Generally, the amount of blowing agent used will depend on the nature of the polymeric material to be expanded, and the desired density of the foam to be produced. Usually, 0.05 to 15, and, most often, 0.1 to 5.0 parts blowing agent are employed, based on 100 parts of polymeric material by weight. The blowing agents can be used alone, or in combination with other blowing agents. Activating substances can be used to increase the gasreleasing efficiency, or to lower the normal decomposition temperature, of the blowing agents of the invention. Other additives such as plasticizers, fillers, nucleating agents, and the like, can also be added to the polymer to be expanded.

The addition polymers or oligomers of the present invention are made by reacting hydrazine with polyfunctional haloformates, and preferably by reacting hydrazine with difunctional haloformates, especially chloroformates, and have the formula (I);

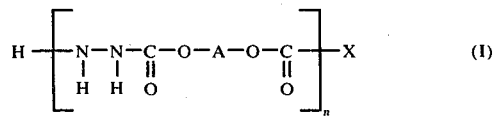

where $n$ is a number in the range 1 to 100, preferably 2 to 50, X is chlorine, bromine or iodine, and A is a divalent radical selected from the group consisting of alkylene radicals having 2 to 6 carbon atoms, arylene radicals having 6 to 12 carbon atoms, oxydialkylene radicals having 4 to 12 carbon atoms, oxydiarylene radicals containing 12 to 20 carbon atoms, alkylenediphenylene radicals in which the alkylene group has from 1 to 6 carbon atoms, and alkylidenediphenylene radicals in which the alkylidene group has from 1 to 6 carbon atoms. Examples of these radicals are: methylene, ethylene, propylene, isopropylene, butylene, isobutylene, pentamethylene, hexamethylene, phenylene, tolylene, naphthylene, biphenylene, oxydiethylene, oxydipropylene, oxydibutylene, oxydipentamethylene, oxydihexamethylene, oxydiphenylene, oxyditolylene, oxydinaphthylene, methylenediphenylene, ethylenediphenylene, propylenediphenylene, ethylidenediphenylene, n-propylidenediphenylene, and isopropylidenediphenylene. If cyclization of these oligomers occurs, the terminal hydrogen and halogen radicals will not be present. The cyclized forms of these oligomers are equally useful as blowing agents.

The second group of blowing agents of the invention are the condensation products of hydrocarbyl carbazates with polyfunctional haloformates, and preferably with difunctional chloroformates. These compounds have the formula (II):

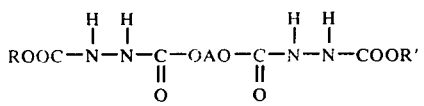

where A has the meaning given above in reference to formula (I), R and R' are the same or different, but preferably the same, and are hydrocarbyl groups such as primary, secondary or tertiary branched-chain and straightchain alkyl radicals having 1 to 8 carbon atoms; cycloalkyl radicals containing 5 to 8 carbon atoms, especially cyclohexyl; and aryl groups having 6 to 10 carbon atoms and aralkyl and alkaryl radicals containing 7 to 10 carbon atoms, such as phenyl, benzyl, the tolyls and the xylyls.

Among these compounds are the reaction products of ethylene glycolbis(chloroformate) or diethylene glycolbis(chloroformate) with an alkyl carbazate such as methyl, ethyl, n-propyl, isopropyl, n-butyl, isobutyl, sec. butyl or tert. butyl carbazate.

The compounds of formula (II) can be made by reacting a difunctional haloformate with a hydrocarbylcarbazate. Schematically, this process is represented as follows:

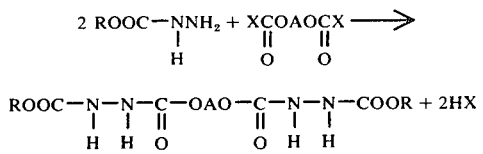

In practice, this process is carried out at temperatures of 20° to 100°C, and atmospheric pressure, in alcoholic or aqueous media, and in the presence of an acid sequestering agent such as an alkali metal carbonate. Compounds of formula (II) include those listed below, such as ethylenebis(-methyl hydrazodicarboxylate)*
ethylenebis(-ethyl hydrazodicarboxylate)
ethylenebis(-n-propyl hydrazodicarboxylate)
ethylenebis(-isopropyl hydrazodicarboxylate)
ethylenebis(-n-butyl hydrazodicarboxylate)
ethylenebis(-isobutyl hydrazodicarboxylate)
ethylenebis(-sec-butyl hydrazodicarboxylate)
ethylenebis(-tert-butyl hydrazodicarboxylate)
ethylenebis(-amyl hydrazodicarboxylate)
ethylenebis(-isoamyl hydrazodicarboxylate)
ethylenebis(-hexyl hydrazodicarboxylate)
ethylenebis(-heptyl hydrazodicarboxylate)
ethylenebis(-octyl hydrazodicarboxylate)
ethylenebis(-cyclopentyl hydrazodicarboxylate)
ethylenebis(-cyclohexyl hydrazodicarboxylate)
ethylenebis(-phenyl hydrazodicarboxylate)
ethylenebis(-tolyl hydrazodicarboxylate)
ethylenebis(-benzyl hydrazodicarboxylate)
*also may be named ethylenebis(3-carbomethoxy carbazate)
and
oxydiethylenebis(methyl hydrazodicarboxylate)
oxydiethylenebis(ethyl hydrazodicarboxylate)
oxydiethylenebis(n-propyl hydrazodicarboxylate)
oxydiethylenebis(iospropyl hydrazodicarboxylate)
oxydiethylenebis(n-butyl hydrazodicarboxylate)
oxydiethylenebis(isobutyl hydrazodicarboxylate)
oxydiethylenebis(sec-butyl hydrazodicarboxylate)
oxydiethylenebis(tert-butyl hydrazodicarboxylate)
oxydiethylenebis(amyl hydrazodicarboxylate)
oxydiethylenebis(isoamyl hydrazodicarboxylate)
oxydiethylenebis(hexyl hydrazodicarboxylate)
oxydiethylenebis(heptyl hydrazodicarboxylate)
oxydiethylenebis(octyl hydrazodicarboxylate)
oxydiethylenebis(cyclopentyl hydrazodicarboxylate)
oxydiethylenebis(cyclohexyl hydrazodicarboxylate)
oxydiethylenebis(phenyl hydrazodicarboxylate)
oxydiethylenebis(tolyl hydrazodicarboxylate)
oxydiethylenebis(benzyl hydrazodicarboxylate)

Also
isopropylidenebis(3-carbomethoxy phenylcarbazate)**
isopropylidenebis(3-carbethoxy phenylcarbazate)
isopropylidenebis(3-carbo-n-propoxy phenylcarbazate)
isopropylidenebis(3-carbisopropoxy phenylcarbazate)
isopropylidenebis(3-carbo-n-butoxy phenylcarbazate)
isopropylidenebis(3-carbisobutoxy phenylcarbazate)
isopropylidenebis(3-carbo-sec-butoxy phenylcarbazate)
isopropylidenebis(3-carbo-tert-butoxy phenylcarbazate)
isopropylidenebis(3-carbamyloxy phenylcarbazate)
isopropylidenebis(3-carboisoamyloxy phenylcarbazate)
isopropylidenebis(3-carbohexyloxy phenylcarbazate)
isopropylidenebis(3-carboheptyloxy phenylcarbazate)
isopropylidenebis(3-carboctyloxy phenylcarbazate)
isopropylidenebis(3-carbocyclopentyloxy phenylcarbazate)
isopropylidenebis(3-carbocyclohexyloxy phenylcarbazate)
isopropylidenebis(3-carbophenoxy phenylcarbazate)
isopropylidenebis(3-carbotoloxy phenylcarbazate)
isopropylidenebis(3-carbobenzoxy phenylcarbazate)

**May also be named isopropylidendiphenylenebis (methyl hydrazodicarboxylate)

DESCRIPTION OF THE PREFERRED EMBODIMENTS

The following examples illustrate the preparation of some of the hydrazodicarboxylate addition polymers and condensation products of the invention, and their use as blowing agents for producing expanded polymeric material.

EXAMPLE I

Reaction of Ethylenebis(Chloroformate) with Ethyl Carbazate

A 1-liter flask was charged with 104 g (1.0 mole) of ethyl carbazate, 53 g (0.5 mole) of sodium carbonate, and 250 ml of water. To this mixture was added 93.5 g (0.5 mole) of ethylenebis(chloroformate) over a period of 45 minutes, while agitating, during which the temperature rose to 65°C. The mixture was then heated to reflux for one hour. The oily layer was separated, poured into hexane, and a product crystallized. The product was filtered, washed with hexane and with hot benzene, and the remaining crystalline solid weighed 109 grams and melted at 132°C. The product began to decompose at 227°C. Dumas analysis gave 16.84% nitrogen; the calculated value is 17.39%. The product has the following structural formula:

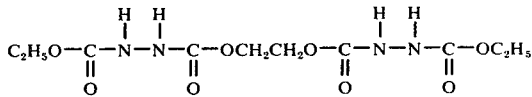

EXAMPLE II

Reaction of Ethylenebis(Chloroformate) with Methyl Carbazate

A 1-liter flask was charged with 90 g (1.0 mole) of methyl carbazate, 53 g (0.5 mole) sodium carbonate and 250 ml ethanol. The temperature was adjusted to 60°C., and 93.5% g (0.5 mole) of ethylene bis (chloroformate) was added dropwise over a period of one-half hour as the temperature rose to 75°C. After addition was complete, the mixture was refluxed one-half hour, sodium chloride crystals were filtered off, and the ethanol filtrate evaporated to one-half its volume. Upon standing overnight, a product crystallized, was filtered, washed with hexane and dried. The product weighed 130 g, melted at 122°–126°C, and decomposed in the range 250°–300°C. Dumas analysis gave 18.57% nitrogen; the calculated value is 19.05%. The product has this structural formula:

$$CH_3O-\underset{\underset{O}{\|}}{C}-\underset{H}{\underset{|}{N}}-\underset{H}{\underset{|}{N}}-\underset{\underset{O}{\|}}{C}-OCH_2CH_2O-\underset{\underset{O}{\|}}{C}-\underset{H}{\underset{|}{N}}-\underset{H}{\underset{|}{N}}-\underset{\underset{O}{\|}}{C}-OCH_3$$

EXAMPLE III

Preparation of Addition Product of Ethylenebis (Chloroformate) with Hydrazine A 2-liter reaction flask was charged with 106 g (1. mole) of sodium carbonate, 33 g (1.0 mole) of anhydrous hydrazine, and 750 ml water. To this stirred mixture, 187 g (1.0 mole) of ethylenebis(chloroformate) was added dropwise over a period of 1.5 hours while the reaction temperature was held below 50°C. After stirring overnight, a white solid formed, was filtered, washed well with water, and dried at 60°C. The yield was 116 g, or 80% of theory. The product melted at 166°–183°C., and decomposed to produce blowing gas in the range 240° to 290°C. Upon complete decomposition, this product yielded 169 cc of gas per gram.

Analysis of the compound gave these data: percent nitrogen calculated, 19.18, found 18.33; percent carbon calculated, 32.87, found 31.55; and percent hydrogen calculated, 4.10, found 4.31.

EXAMPLE IV

Preparation of Ethylenebis(n-propyl hydrazodicarboxylate)

A 3 liter flask was charged with:
500 ml ethanol
260 g (2.2 mole) n-propyl carbazate
176 g (2.1 mole) sodium bicarbonate The mixture was stirred as 187 g (1.0 mole) of ethylenebis(chloroformate) was dropped in over 45 minutes. The temperature increased as the chloroformate was added and a water bath was applied to keep the temperature under 40°C. Carbon dioxide was evolved in a rapid stream during the reaction. Finally, the mix was stirred an additional hour and a liter of cold water was gradually added. The diluted mix was stirred and cooled for an additional 2 hours, whereupon the product separated as a white crystalline solid. This was filtered off, washed with water and dried.

Yield = 245g; mp 107°–108°C

EXAMPLE V

Preparation of Oxydiethylenebis(methyl hydrazodicarboxylate)

A 2-liter flask charged with:
53g sodium carbonate
250 ml ethanol
99g (1.1 mole) methyl carbazate Mix was stirred as 115.5g (0.5 mole) of oxydiethylenebis(chloroformate) was added dropwise over 1/2 hour, holding the reaction temperature under 50°C. Following the addition the mixture was stirred and warmed to 70°C. for 1 hour. The separated sodium chloride was filtered off (60g) and ethanol was evaporated from the filtrate. The oily residue was crystallized in hexane.

Yield = 175g; mp 100°–125°C

This product was recrystallized in benzene

| Analysis | Calculated | Found |
|---|---|---|
| %C | 35.50 | 34.87 |
| H | 5.32 | 5.49 |
| N | 16.97 | 16.68 |

EXAMPLE VI

Preparation of Oxydiethylenebis (ethyl hydrazodicarboxylate)

Into a 2-liter three-neck flask was charged
53 grams (0.5 mole) sodium carbonate
250 ml ethanol
114.5 (1.1 mole) ethylcarbazate The mixture was stirred as 115.5g (0.5 mole) of oxydiethylenebis(chloroformate) was added dropwise over one-half hour, holding the temperature under 50°C. After the addition was complete the mix was warmed to 70°C for 1 hour. The separated sodium chloride was filtered off and then ethanol was evaporated from the filtrate. The oily residue was crystallized from benzene.

Yield = 187g; mp. 116°–122°C.

| Analysis: | Calculated | Found |
|---|---|---|
| %C | 39.34 | 39.47 |
| H | 6.01 | 6.04 |
| N | 15.30 | 15.28 |

EXAMPLE VII

Preparation of Oxydiethylenebis(isopropyl hydrazodicarboxylate)

A 2-liter flask was charged with:
53 grams (0.5 mole) sodium carbonate
250 ml ethanol
130 g (1.1 mole) isopropyl carbazate The mixture was stirred as 115.5g (0.5 mole) of oxydiethylenebis(chloroformate) was added over one-half hour, holding the reaction temperature under 50°C. After addition was complete the mix was heated to 70°C. and allowed to stir for 1 hour. The sodium chloride precipitate was filtered off (63g). The ethanol was evaporated from the filtrate and the oily residue was crystallized from a 50/50 mix of benzene and hexane.

Yield = 173g; mp 101°–104°C

This material decomposes to produce gaseous products at 205°–270°C.

| Analysis | Calculated | Found |
|---|---|---|
| %C | 42.64 | 42.66 |
| H | 6.60 | 6.80 |
| N | 14.27 | 14.22 |

EXAMPLE VIII

Preparation of 4,4'-Isopropylidenebis (N'-carbisobutoxyphenyl carbazate)

Into a 2-liter flask was introduced:

500 ml ethanol
145.7 g (1.1 mole) isobutyl carbazate
84 g (1.0 mole) sodium bicarbonate The mixture was stirred as 176.5g (0.5 mole) of bisphenol A bischloroformate was added over ½ hour, holding the temperature under 50°C. Then the mixture was stirred for ½ hour as the temperature was increased to 70°C. The separated sodium chloride was filtered off (60 g) and the ethanol was removed from the filtrate (topped to 150°C. 12mm). The clear yellow oil was poured from the flask and allowed to cool and harden.

Yield = 28.2g light yellow resin; mp = 65°–70°C; dec 210°–300°C.

EXAMPLE IX

Expansion of Polysulfone Resin with Ethylene bis (ethyl hydrazodicarboxylate)

Ethylenebis(ethyl hydrazodicarboxylate) was tumble-blended with pellets of polysulfone resin, coded P–1700, and made by Union Carbide Company. These pellets were fed into an extruder (Laboratory Plastic Extruder, Table Model, made by Wayne Machine & Dye Co., and having a 0.75 inch diameter, and a length-/diameter ratio of 20:1), under the conditions shown in Table I. The density measurement of the expanded extrudate demonstrates that the blowing agent of the invention expands the polysulfone effectively, and lowers its density significantly.

heated to elevated temperatures. This is demonstrated by the data in the following table.

| Compound | Heat Loss(% by weight) of Blowing Agents Exposure Time at 250°F | | | |
|---|---|---|---|---|
| | 1 hr. | 2 hrs. | 3 hrs. | 4 hrs. |
| Diethyl hydrazodicarboxylate | 8.3 | 39.5 | 53.3 | 99.5 |
| Di-n-propyl hydrazodicarboxylate | 9.0 | 24.3 | 31.7 | 98.9 |
| Diisopropyl hydrazodicarboxylate | 23.6 | 48.0 | 62.5 | 99.9 |
| Diisobutyl hydrazodicarboxylate | 9.6 | 16.9 | 30.3 | 99.4 |
| Ethylenebis (2-carbethoxy carbazate) | 0.3 | 0.3 | 0.6 | 8.1 |

Heat loss measurements on homologues of ethylenebis (2-carbethoxy carbazate) such as the 2-carbomethoxy carbazate, the 2-carbisopropoxy carbazate and the 2-carbisobutoxy carbazate gave very similar results.

The heat loss test used was the standard one known to the art for measuring the degree of sublimation or heat loss of chemical and polymeric materials. The temperature in the air oven used was 250°F(ca.121°C).

The lower degree of sublimation or heat loss of the blowing agents of the invention is advantageous because it indicates a significantly lower loss of blowing agents of the invention during the step of drying the polymer-blowing agent mixture which commonly precedes the shaping or other processing operation.

What is claimed is:

1. An oligomer of the formula

TABLE I

| | Expansion of Polysulfone with Ethylenebis(ethyl hydrazodicarboxylate) | | | | | | | |
|---|---|---|---|---|---|---|---|---|
| Blowing Agent | %Blowing Agent by Weight | Extruder Temperature °C | | | | Screw Speed | Density | %Density Reduction |
| | | Rear | Front | Die | Stock | | | |
| None (Resin alone) | — | — | — | — | — | — | 1.22265 | — |
| Ethylenebis(ethyl hydrazodicarboxylate) | 1.0 | 277 | 299 | 243 | 263 | 30 | 0.44370 | 63.4 |

EXAMPLE X

Expansion of Polycarbonate Polymer

A 5% glass-filled polycarbonate polymer (Lexan "FL 900." product of General Electric Company) was injection molded, using 1 part of the blowing agents listed below per one hundred parts of resin, employing a 4½ oz. Battenfeld reciprocating screw injection molding machine.

Table

| Blowing Agent | Sample Weight (g) | % Weight Reduction |
|---|---|---|
| None | 150 | — |
| EEHD | 93 | 38 |
| EIPHD | 90 | 40 |
| EIBHD | 90 | 40 |
| OIPHD | 74 | 51 |

EEHD = ethylenebis(ethyl hydrazodicarboxylate)
EIPHD = ethylenebis(isopropyl hydrazodicarboxylate)
EIBHD = ethylenebis(isobutyl hydrazodicarboxylate)
OIPHD = oxydiethylenebis(isopropyl hydrazodicarboxylate)

The above results indicate the efficiency of the compounds of the invention in effectively expanding a thermoplastic resin.

The new blowing agents of the present invention have an unexpected advantage over simple dihydrocarbyl hydrazodicarboxylates in that the agents of the invention undergo less sublimation or heat loss when

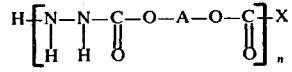

wherein $n$ is a number in the range of from 1 to 100, X is chlorine, and A is a divalent radical selected from the group consisting of alkylene radicals having 2 to 6 carbon atoms, arylene radicals 6 to 12 carbon atoms, oxydialkylene radicals having 4 to 12 carbon atoms, and oxydiarylene radicals containing 12 to 20 carbon atoms, alkylenediphenylene radicals in which the alkylene group has from 1 to 6 carbon atoms, and alkylidenediphenylene radicals in which the alkylidene group has from 1 to 6 carbon atoms.

2. The oligomer of claim 1, wherein A is selected from the group consisting of methylene, ethylene, propylene, isopropylene, butylene, isobutylene, pentamethylene, hexamethylene, phenylene, tolylene, naphthylene, biphenylene, oxydiethylene, oxydipropylene, oxydibutylene, oxydipentamethylene, oxydihexamethylene, oxydiphenylene, oxyditolylene, oxydinaphthylene, methylenediphenylene, ethylenediphenylene, propylenediphenylene, ethylidenediphenylene, n-propylidenediphenylene, and isopropylidenediphenylene.

3. The oligomer of claim 2, wherein A is ethylene.

* * * * *